US012179271B2

(12) United States Patent
Presnitz

(10) Patent No.: US 12,179,271 B2
(45) Date of Patent: Dec. 31, 2024

(54) PRESS TOOL AND METHOD FOR FORMING A CUTTING INSERT GREEN BODY HAVING A THROUGH HOLE

(71) Applicant: WALTER AG, Tubingen (DE)

(72) Inventor: Manuel Presnitz, Espoo (FI)

(73) Assignee: Walter AG, Tubingen (DE)

( * ) Notice: Subject to any disclaimer, the term of this patent is extended or adjusted under 35 U.S.C. 154(b) by 227 days.

(21) Appl. No.: 17/917,039

(22) PCT Filed: Dec. 21, 2020

(86) PCT No.: PCT/EP2020/087374
§ 371 (c)(1),
(2) Date: Oct. 5, 2022

(87) PCT Pub. No.: WO2021/204413
PCT Pub. Date: Oct. 14, 2021

(65) Prior Publication Data

US 2023/0150019 A1 May 18, 2023

(30) Foreign Application Priority Data

Apr. 8, 2020 (EP) .................................... 20168742

(51) Int. Cl.
*B22F 3/03* (2006.01)
*B22F 5/00* (2006.01)
(Continued)

(52) U.S. Cl.
CPC .................. *B22F 3/03* (2013.01); *B22F 5/10* (2013.01); *B30B 11/007* (2013.01);
(Continued)

(58) Field of Classification Search
CPC ... B30B 11/007; B30B 11/027; B30B 15/022; B22F 2003/031; B22F 2005/001; B22F 3/03; B22F 5/10; B28B 3/08; B28B 3/10
See application file for complete search history.

(56) References Cited

U.S. PATENT DOCUMENTS 5,976,436 A * 11/1999 Livesley ............... B30B 11/007 425/389
2006/0165828 A1 7/2006 Smilovici et al.
(Continued)

FOREIGN PATENT DOCUMENTS

| | | | |
|---|---|---|---|
| CN | 104368811 | A | 2/2015 |
| DE | 102016119429 | A1 | 4/2018 |
| WO | 20040414463 | A2 | 5/2004 |

*Primary Examiner* — Emmanuel S Luk
*Assistant Examiner* — Victoria Bartlett
(74) *Attorney, Agent, or Firm* — Corinne R. Gorski

(57) ABSTRACT

A press tool and a method for forming a cutting insert green body. The press tool includes a first and a second core rod. Both core rods are movably arranged along an axis. When both core rods are in a press position, their respective contact surfaces contact each other and when both the first and second core rods are in a release position, their respective contact surfaces are separated. The first core rod includes a base body having a forwardly facing abutment surface and a piston having a shaft and a head. The piston is movable to a plurality of extended positions and to a retracted position, in which the abutment surface of the head abuts against the abutment surface of the base body. When both the first core rod and the second core rod are in their respective press positions, the piston is in the retracted position.

15 Claims, 7 Drawing Sheets

(51) Int. Cl.

| | |
|---|---|
| ***B22F 5/10*** | (2006.01) |
| ***B30B 11/00*** | (2006.01) |
| ***B30B 15/02*** | (2006.01) |

(52) U.S. Cl.
CPC ...... *B30B 15/022* (2013.01); *B22F 2003/031* (2013.01); *B22F 2005/001* (2013.01)

(56) References Cited

U.S. PATENT DOCUMENTS

| | | | | |
|---|---|---|---|---|
| 2009/0169412 | A1* | 7/2009 | Samuelsson .......... | B30B 11/027<br>419/68 |
| 2014/0086695 | A1 | 3/2014 | Jameson et al. | |

* cited by examiner

PRESS TOOL AND METHOD FOR FORMING A CUTTING INSERT GREEN BODY HAVING A THROUGH HOLE

RELATED APPLICATION DATA

This application is a § 371 National Stage Application of PCT International Application No. PCT/EP2020/087374 filed Dec. 21, 2020 with priority to EP 20168742.3 filed Apr. 8, 2020.

TECHNICAL FIELD

The present invention relates to a press tool for forming, by compressing a powder, a cutting insert green body having a through hole of length (L). The present invention further relates to a method forming a cutting insert green body having a through hole of length (L) with a press tool.

BACKGROUND

WO2004/041463 discloses a uni-axial press for forming a green part from compressed metallurgical powder, wherein an opening is imparted in the green part by placing the metallurgical powder about an oval-shaped core rod. The core rod comprises a first segment and a second segment each having complimentary ends. The segments are arranged at opposite sides of the press and are movable along their longitudinal axis. During operation, the segments are pushed together so that their ends meet, and a continuous core rod is formed. Then powder is filled into a die cavity and the green part is formed. Finally, the segments are retracted, and the finished green part is ejected. A problem with this known press is that the segments leave a ring of burr in the opening of the green part in the position where the ends of the segments contacted each other. In the finished cutting insert, such remaining burr rings may form sharp edges that can damage a fastening screw.

SUMMARY

An object of the present invention is to at least partly obviate the above-mentioned problems. This object is achieved according to the invention by means of a press tool according to claim 1 and by means of a method for forming a cutting insert green body according to claim 14.

An inventive press tool for forming, by compressing a powder, a cutting insert green body having a through hole of length (L), comprises a cavity operable to define a compression space corresponding to the dimensions of the green body, a first core rod and second core rod for together forming the through hole, which each have a longitudinal extension from a front end to a rear end, and a contact surface at the front end, wherein the first core rod and the second core rod both are longitudinally arranged along a core axis with their respective front ends facing each other, the first core rod and the second core rod both are movably arranged in both directions of the core axis, wherein the first core rod and the second core rod both are movable to a respective press position, and to a respective release position, wherein when both the first core rod and the second core rod are in their respective press positions, their respective contact surfaces contact each other inside the compression space, and wherein, when both the first core rod and the second core rod are in their respective release positions, their respective contact surfaces are separated by a distance that is larger than the length (L), the first core rod comprises a longitudinally extending rearward portion in form of a base body, which, at a front end, comprises a forwardly facing abutment surface, and a piston having a rear portion in form of a longitudinally extending shaft (13), and a front portion in form of a radially protruding head, wherein the contact surface is a front end surface of the head, the head comprises, at a rear end, a rearwardly facing abutment surface, and wherein the shaft (13) is longitudinally movably arranged in the base body along the core axis, such that the piston is movable to a plurality of extended positions and to a retracted position, in which retracted position the abutment surface of the head abuts against the abutment surface of the base body, and wherein, when both the first core rod and the second core rod are in their respective press positions, the piston is in the retracted position.

An inventive method for forming a cutting insert green body having a through hole of length (L) with a press tool, wherein the press tool comprises a cavity, a first core rod and second core rod, which each have a longitudinal extension from a front end to a rear end, and a contact surface at the front end, wherein the first core rod comprises a longitudinally extending rearward portion in form of a base body, which, at a front end, comprises a forwardly facing abutment surface, a piston having a rear portion in form of a longitudinally extending shaft, and a front portion in form of a radially protruding head, wherein the contact surface is a front end surface of the head, and the head comprises, at a rear end, a rearwardly facing abutment surface, comprising the steps of arranging both the first core rod and the second core rod longitudinally along a core axis with their respective front ends facing each other, arranging the piston with the shaft thereof longitudinally along the core axis in the base body, filling the cavity with a predetermined amount of powder, moving the piston along the core axis to a retracted position, wherein the abutment surface of the head abuts against the abutment surface of the base body, moving the first core rod and the second core rod along the core axis to a respective press position, wherein their respective contact surfaces contact each inside the cavity in a compression space, which corresponds to the dimensions of the green body, operating the cavity to compress the powder in the compression space to form the cutting insert green body, moving, along the core axis, the second contact rod rearward and the piston forward to a first extended position, moving the first core rod and the second core rod along the core axis to a respective release position, wherein their respective contact surfaces are separated by a distance that is larger than the length (L) and operating the cavity to decompress the compression space, and removing the cutting insert green body.

During forming of a cutting insert green body, the first core and the second core rods are both placed in their respective press positions, wherein the contact surfaces contact each other and the abutment surfaces contact each other. At a first interface of the contact surfaces and at a second interface of the abutment surfaces, a respective annular ring of burr may form in the through hole of the cutting insert green body. Thanks to the first core rod comprising a piston that is movable to extended positions, these burr rings can be removed, or at least considerable reduced, before the cutting insert green body is removed from the press tool. This can for example be achieved by first retracting the second core rod a distance rearward from its press position. Then, or at the same time, the piston is moved forward and past the burr ring at the interface between the contact surfaces. Thereafter, both the first core rod and the second core rod are moved to their respective release positions, wherein the piston travels over the interface between the contact surfaces a second time and over the interface between the abutment surfaces. Due to the piston travelling over the burr rings, these are at least partly scraped off the internal surface of the through hole.

The press tool according to the present invention is suitable for forming a cutting insert green body by compressing a powder, such as cermet, cemented carbide powder or a metallurgical powder. After the finished cutting insert green body has been formed and removed from the press tool, it can be subjected to other treatments such as sintering, grinding, edge treatment and/or coating. A cutting insert can be obtained from the cutting insert green body and used for machining, for example metal cutting. Examples of such cutting inserts are milling cutting inserts, turning cutting inserts and drilling cutting inserts.

The press tool according to the present invention can be of any suitable kind. Preferably, the press tool comprises a die and two punches, which punches are movable toward and away from each other along a punch axis. For example, the press tool is a so-called uniaxial press tool comprising a die and two punches; a so-called split die press tool comprising a die having at least two movable parts and two movable punches; or a so-called cross hole press tool wherein the core axis is perpendicular to the punch axis. The space defined by the die and the punches in their closest position constitutes a compression space, which corresponds to the shape and dimensions of the cutting insert green body.

The first core rod and the second core rod are both longitudinally arranged along a core axis with their respective front ends facing each other. The core axis can have any suitable extension in the press tool, for example horizontal or vertical. In a press tool comprising movable punches, the core axis can be the same as the punch axis or perpendicular to the punch axis. In a press tool comprising a split die comprising halves that are movable towards and away from each other along a die axis, the core axis can coincide with the die axis, or be perpendicular to one or both of the die axis and the punch axis.

Preferably, a longitudinal axis of the first core rod and a longitudinal axis of the second core rod are aligned and coincide with the core axis. However, the axes can be slightly offset and parallel.

A forward movement of a core rod is in a direction toward the other core rod, and a rearward movement is away from the other core rod. Thus, a forward movement may be a movement toward a centre of the compression space, but can also be a movement past the centre.

Optionally, the first core rod and the second core are self-contained components, or, one or both integral and in one piece with other parts of the press tool. For example, a core rod can be part of a punch or a die half and only movable together with the punch or die half. However, it is preferred that the core rods are separate components that are movably guided in the press tool, for example in the die or in the punches.

According to at least one embodiment, the first and second core rods are arranged to be independently movable. Thereby advantageously the first core rod can be brought to any of its positions independent of the position of the second core rod, and vice versa. In another embodiment, the first core rod and the second core rod are arranged movable in synchronization. Thereby advantageously the movement towards and away from each other of the first and the second core rod is easier to drive and control. Optionally, the piston is movable at least partly independently from the movements of the first core rod and the second core rod. One or several drive units can be used to drive the movement of the core rods and the piston, such as for example an electric motor, a pneumatic or hydraulic drive unit. The operation of the drive units can be controlled by a control unit such as a PLC (programmable logic controller).

Preferably, the first core rod is movable to a scraping position, wherein the forwardly facing abutment surface of the base body is at most so far forward as when the first core rod is in the press position. The piston is in a first of the plurality of extended positions, wherein the contact surface in form of the front end surface of the head is further forward than in the press position. Thereby the base body of the first core rod does not have to move further forward in order to bring the head of the piston forward.

According to at least one embodiment, the second core rod comprises a segment that tapers toward the front end, the base body comprises a segment that tapers toward the front end, the head has a constant cross section, and wherein, in the press position, the length (L) includes at least a portion of the tapering segment of the second core rod, the head, and at least a portion of the tapering segment of the base body. This is advantageous in that cutting insert green bodies that have a through hole with countersink at both ends can be formed in the press tool. Optionally, the tapering segment can extend all the way to the front end, or, the segments can comprise a portion having the same cross section as the head closest to the front end.

Preferably, the first core rod and the second core rod together form a continuous core rod when both are in their respective press positions. Specifically, the shape of a cross section of the second core rod at the contact surface thereof is the same as the shape of a cross section of the head at the contact surface thereof, and/or the shape of a cross section of the head at the abutment surface is the same as the shape of a cross section at the abutment surface of the base body. For example, the shape of the cross section of the head and the core rods over the length (L) is elliptical or cylindrical. The dimension of the cross section of the base body and the second core rod can increase rearward from the head. At least along the length (L), the continuous core rod can be mirror symmetrical over a cross sectional plane located in the centre of length (L). The longitudinal centre of length (L) can correspond to the longitudinal centre of the head.

Optionally, when both core rods are in their respective press position, both contact surfaces are in a central position along the length (L), or in a position to the side of the central position. Thus, during operation, the length (L) can be occupied by portions of the core rods that have equal length, or the first core rod can occupy a larger length than the second core rod, or, vice versa.

Preferably, the longitudinal length of the head is at least 1 mm shorter than the length (L). Preferably, the longitudinal length of the head is longer than 0.5 mm, more preferably larger than 1.3 mm. According to at least one embodiment, the longitudinal length of the head is ⅓ of the length (L).

According to at least one embodiment, the head has a length in the axial direction of the core axis, wherein the axial length of the head, in the press position, is reduceable by 5-40 μm, preferably 20-30 μm. This allows a press tool to be designed to provide additional compaction in the direction of the core axis, which is advantageous when forming a cutting insert green body with a countersink. For example, the head comprises a material with a Young's modulus (E) of less than 400 GPa, such as steel, or the head comprises a piezoelectric disc which can be operated to change the thickness thereof.

According to at least one embodiment, the piston is arranged biased toward the first extended position. Thereby, when the second core rod is moved rearward, the piston automatically moves to an extended position, for example a further forward position such as the scraping position. For example, a resilient element such as a spring can be arranged to press the piston forward toward extended positions. Alternatively, the first core rod can be configured to provide bias to the piston by means of pressurized fluid, such as air or oil.

Preferably, the first core rod comprises a stop mechanism defining a maximal extended position of the plurality of extended positions of the piston. Thereby, when the piston is in this maximal extended position and the base body is moved rearward, the piston will move rearward together with the base body. The stop mechanism does also prevent the piston from disengaging from the base body.

According to at least one embodiment, the base body has a bore that extends rearward from an opening in the front end of the base body, and a rear end of the shaft extends through the opening and into the bore. The forwardly facing abutment surface of the base body is a front end surface surrounding the opening. This is a convenient design of the first core rod that allows the shaft to be guided inside the base body in the bore. In embodiments comprising a biasing element and/or a stop mechanism, these can be arranged inside the bore.

According to at least one embodiment, the front end of one of the first core rod and the second core rod comprises a rearward extending recess, and the front end of the other one of the first core rod and the second core rod comprises a mating forward extending projection, wherein, when both the first core rod and the second core rod are in their respective press positions, the projection is received in the recess for aligning the first core rod and the second core rod. For example, the head comprises a male protrusion that is projecting forward from the front end, and the second core rod comprises a mating female depression that extends rearward from the front end. With good alignment of the first core rod and the second core rod, good tolerances of the through hole in of the cutting insert green body can be achieved.

Optionally, the contact surface is a forwardly facing front end surface. For example, the contact surface is a front end surface that is normal to the core axis. In embodiments with mating projections/recesses, the contact surface may be a surface of the projection/recess. In such embodiments, the contact surface may also be, or comprise parts that are, forwardly facing, longitudinally extending circumferential surfaces of the projections/recesses.

Optionally, the opening of the bore in the base body comprises a countersink.

According to at least one embodiment, the piston further comprises a neck, which extends along the core axis from the rear end of the head to a front end of the shaft, and mates with the countersink in the base body bore. When the piston is in the retracted position, the neck is received in the countersink for aligning the piston and the base body. With good alignment of the piston and the base body, good tolerances of the through hole in of the cutting insert green body can be achieved.

Preferably, both the front end and the rear end of the head comprises projections that mate with corresponding recesses in the second core rod and in the base body, respectively, for providing even better alignment and thereby further improved tolerances of the through hole in the cutting insert green body. The projections/recesses may include conical, cooperating guide surfaces.

According to at least one embodiment, countersink in the base body does not cooperate with a corresponding neck of the head. Instead the countersink is configured to receive debris from the scraped off burr rings so that the debris is removed from the surface of the shaft. Thereby wear caused by the debris sliding over the surface of the shaft and the interior surface of the through hole can be reduced. In addition or instead, the head can be provided with an annular groove in the rearward facing abutment surface bordering the shaft.

In order to improve the wear resistance of the head, the head can comprise cemented carbide. The head can be provided with a wear resistant coating, preferably deposited by PVD or CVD technique.

Preferably, the piston is removable received in the base body. Thereby the piston can be replaced should the head be worn from scraping off the burr rings, for example at the circumferential edges.

According to at least one embodiment, the forwardly facing abutment surface of the base body is a front end surface bordering the opening in the base body, and the rearwardly facing abutment surface of the head is a rear end surface bordering the neck. Optionally, the abutment surfaces are normal to the core axis. In embodiments with mating neck/countersink, the abutment surfaces may also be, or comprise parts that are, longitudinally extending circumferential surfaces of the neck/countersink.

According to at least one embodiment, the shaft and the bore in the base body, at least along a portion closest to the opening, have the same cross sectional shape. The inner dimensions of the bore are adapted to the outer dimensions of the shaft so that the shaft fits with sliding contact in the bore. The cross sectional shape of the shaft and the bore can be circular. Optionally, the cross sections have a shape that prevent relative rotation. For example, the cross section shape is polygonal or comprises a circular part with a linear side. Alternatively, the shaft is provided with a radially protruding pin that is received in a slot in the bore.

According to at least one embodiment wherein the core axis is horizontal, the shaft has side surfaces that converge upward forming a ridge. Thereby debris from the scraped off burr rings that falls on the shaft will be guided downwards away from the shaft. That reduces the risk of debris getting stuck at the opening, and the risk of debris causing jamming of the shaft in the bore or wear. For example, the shaft can have a triangular cross section.

According to at least one embodiment of the inventive method for forming a cutting insert green body having a through hole of length (L) with a press tool includes using a press tool according to the present invention and any embodiments thereof. The steps of the inventive method can be performed in any order that is suitable for the process in question.

Preferably, a step of producing the press tool and the steps of arranging the first core rod, the second core, and the piston therein are performed first and before starting a first press cycle. In following press cycles, these steps can be excluded.

Preferably, the steps of moving the piston along the core axis to a retracted position, wherein the abutment surface of the head abuts against the abutment surface of the base body, moving the first core rod and the second core rod along the core axis to a respective press position, wherein their respective contact surfaces contact each other inside the cavity in a compression space, which corresponds to the dimensions of the green body, and filling the cavity with a predetermined amount of powder, can be performed in arbitrary order.

According to an embodiment using a cross hole press tool, the first of these steps is moving the piston, the second is moving the first core rod and the second core rod, and the third step is filling the cavity. The first and the second core rods are both moved forward into the cavity in order to reach their respective press positions.

According to an embodiment using a uniaxial press tool, the first of these steps is filling the cavity, the second is moving the piston, and the third is moving the first core rod and the second core rod. The second core rod is moved rearward form a fill position in the cavity and the first core rod is moved forward in order to reach their respective press positions.

Preferably, the step of operating the cavity to compress the compression space is performed after the above three steps. Preferably, the step of operating the cavity to compress the compression space includes steps of moving punches toward each other according to a predetermined scheme. For example, the movement of the punches can follow a curve that for example has a steeper inclination at the beginning than at the end of the compression step. In embodiments wherein a press tool comprising a split die is used, also the movement of the die parts follow a predetermined scheme. The movement of the die parts may follow a curve, that for example has a steeper inclination at the beginning than at the end of the compression step. Optionally the movement of each punch and where applicable, each die, are individually controlled or all or some move in synchronization.

When the cavity has reached the desired compression, a compression space is defined between the die and the punches. The compression space corresponds to the shape and dimension of the cutting insert green body.

According to embodiments, the method comprises an unloading step after the compression step. Therein the punches a retracted only a minor distance, for example 0.050-0.1 mm, in order to relax the green body so that following movements of the core rods are facilitated.

Optionally, the step of moving the second core rod rearward comprises moving the second core rod completely out of the through hole of the green body, or at least at least 0.1 mm. Thereby the head is given enough room to travel forward and scrape off a burr ring that may have been formed in the step of compressing of the powder. Therein the head reaches a first extend position which is further forward than the press position. In the first extended position, the contact surface of the head is further forward than the burr ring formed at the interface between the contact surfaces during the compression step. In embodiments of the method wherein a biased piston is used, the head moves forward together with the second core rod moving rearward.

Preferably, the forward movement of the head to the first extended position is at least the thickness of the burr ring, which normally is less than 0.1 mm. Preferably, the head moves forward a distance that is equal to the longitudinal length of the head.

Preferably, the following step comprises moving the first core rod and the second core rod to their respective release positions. Optionally, both core rods are placed with their contact surfaces outside the through hole, or only one of the first and the second core rod is placed with the contact surface thereof outside the through hole. Preferably, when both the first and the second core rods have been moved to their respective release positions, the distance between the contact surfaces is larger than length (L) of the through hole by at least 1 mm, preferably at least 5 mm.

Preferably, the step of operating the cavity to decompress the compression space includes steps of moving punches, and where applicable die parts, away from each other according to a predetermined scheme. Therein the punches and any movable die parts may follow a curve that may be less steep at the beginning of the decompression step than at the end of decompression step.

Finally, the cutting insert green body is removed from the press tool. In embodiments wherein one of the core rods has a release position inside the through hole, the cutting insert green body is lifted off the core rod and only thereafter separated from the press tool. Optionally, the contact surface of one of the first and the second core rods has the same location in the compression space in both the press position and the release position. In embodiments wherein the distance between the contact surfaces in the release position is only a small distance larger than the length (L), the cutting insert green body is removed perpendicular to the core axis from the cavity.

BRIEF DESCRIPTION OF THE DRAWINGS

In the following, example embodiments will be described in greater detail and with reference to the accompanying drawings, in which.

Figure 1:
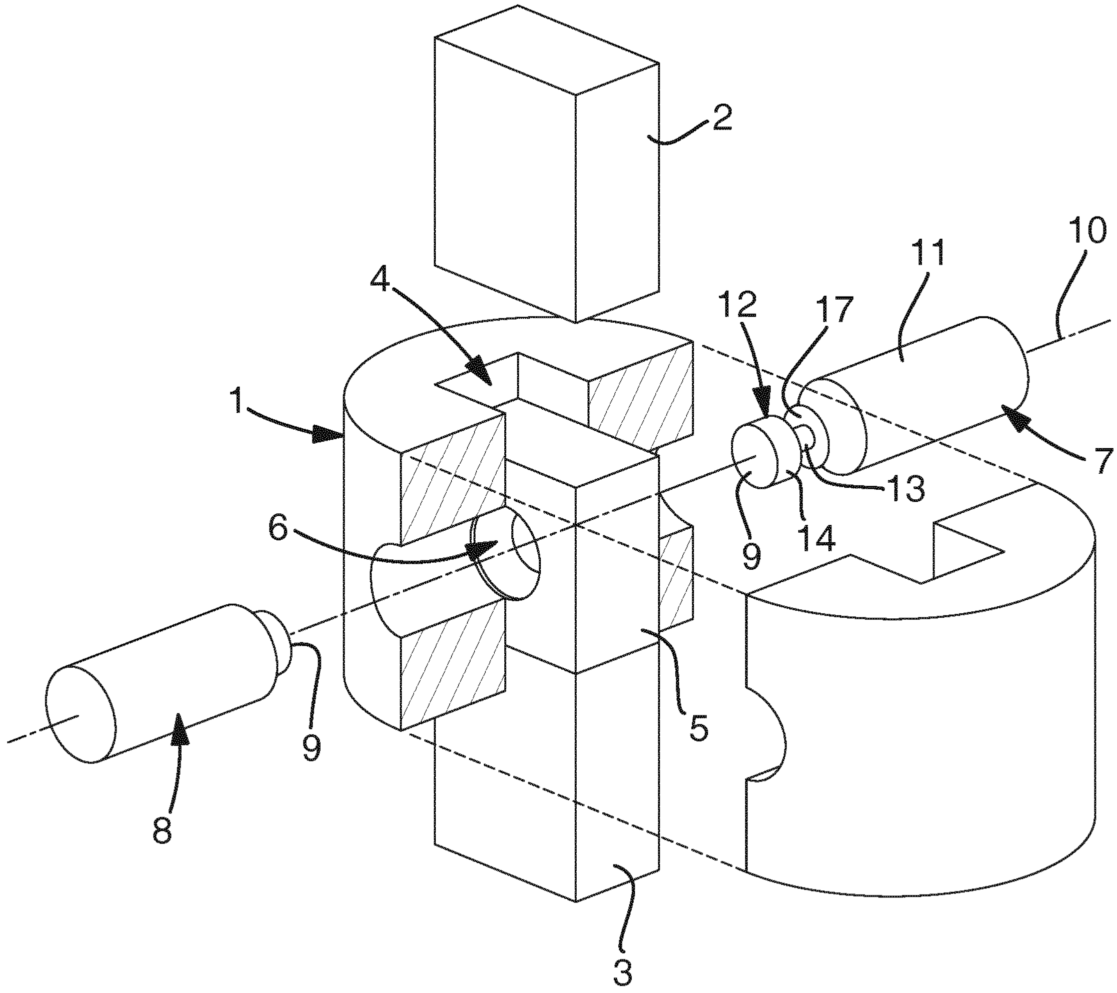
FIG. 1 is an exploded view with partly cutaway portions of the general design of the press tool according to an embodiment of the present invention as realized in a cross hole press tool.

All the figures are schematic, not necessarily to scale, and generally only show parts which are necessary in order to elucidate the respective embodiments, whereas other parts may be omitted or merely suggested. Unless otherwise indicated, like reference numerals refer to like or corresponding parts in different figures.

DETAILED DESCRIPTION

Figure 3:
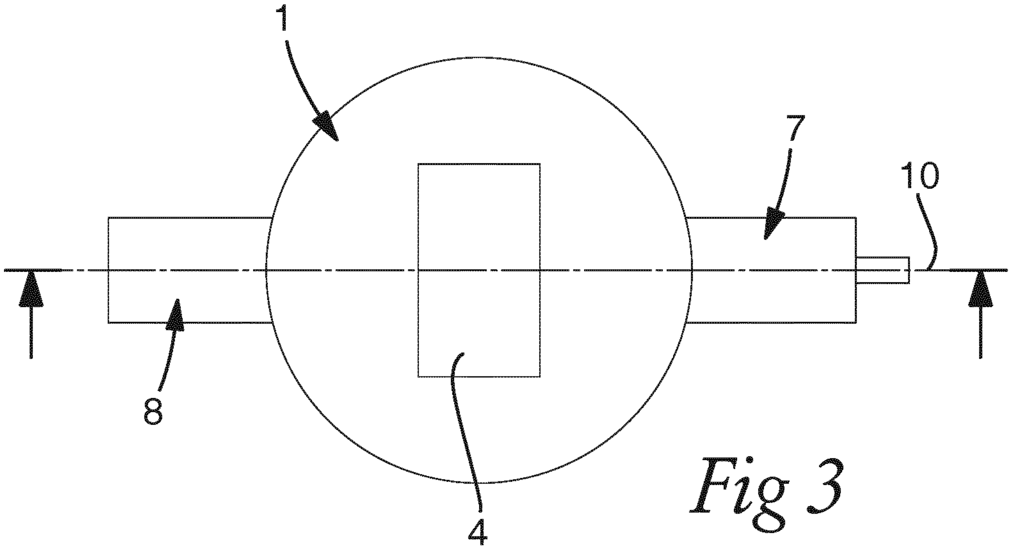
FIG. 3 is a top view of the press tool according to the first embodiment.

In FIG. 1 the general design of an embodiment of the press tool according to the present invention is shown in an exploded view. The press tool is a cross hole press tool with a die 1. In the figure, the die is shown broken apart in the middle in order to show the interior thereof. The press tool further comprises an upper punch 2 and a lower punch 3. The punches 2, 3 are movable toward and away from each other along a punch axis. The die 1, the upper punch 2 and the lower punch 3 define a cavity 4 between them. The cavity (4) is operable to define a compression space by moving the punches toward each other along a vertical punch axis. The compression space corresponds to the space and dimensions of a cutting insert green body 5 that is to be formed by the press tool. In FIG. 1, the compression space is occupied by the cutting insert green body 5, which has a through hole 6 of length (L), c.f. FIG. 3*f.*

The press tool further comprises a first core rod 7 and a second core 8. They each have a longitudinal extension from a front end to a rear end and a contact surface 9 at the front end. The first and the second core rods 7, 8 are longitudinally arranged along a horizontal core axis 10, wherein their respective central longitudinal axis coincide with the core axis 10 and their respective contact surfaces 9 face each other. The first core rod 7 and the second core rod 8 are both movably arranged in both directions of the core axis 10. A forward movement of a core rod is in a direction toward the other core rod, and a rearward movement is away from the other core rod.

Figure 2:
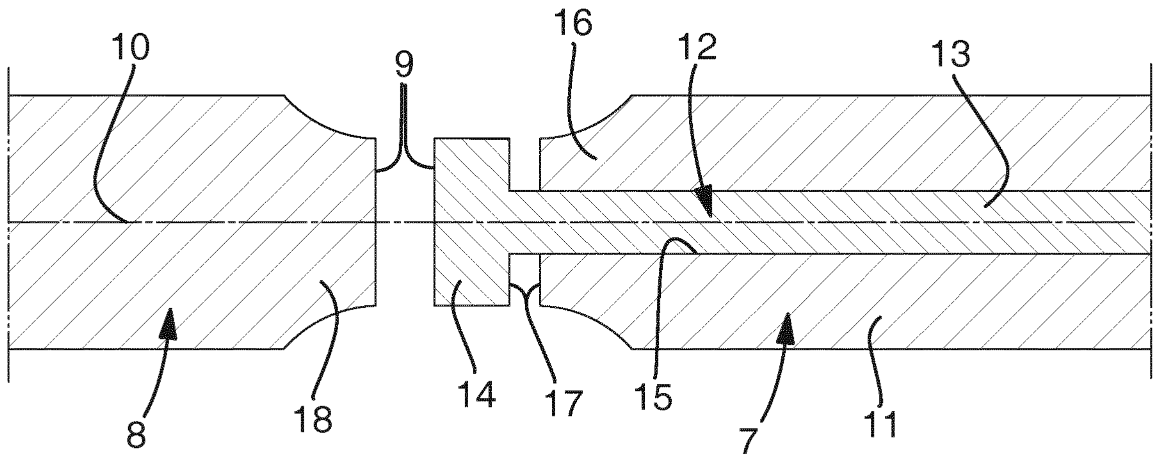
FIG. 2 shows a longitudinal section of a first core rod and a second core rod according to the first embodiment.

With reference to FIG. 2, the first core 7 comprises a longitudinally rearward portion in form of a base body 11, and a piston 12. In a longitudinally forward portion, the base body comprises a segment 16 that tapers toward the front end. A bore 15 extends rearward from an opening in the tapering segment 16 at the front end of the base body 11. A forwardly facing abutment surface 17 is a front end surface surrounding the opening, which front end surface is normal to the core axis 10.

The piston 12 comprises a rear portion in form of a longitudinally extending shaft 13 and, at a front end of the shaft, a head 14 that is radially protruding from the shaft 13. The shaft 13 is longitudinally movably arranged in the bore 15 of the base body 11. A longitudinal axis of the shaft and a longitudinal axis of the bore both coincide with the core axis 10. The contact surface 9 of the first core rod is a front end surface of the head 14, which front end surface is normal to the core axis 10. The head 14 has a rearwardly facing abutment surface 17, which is a rear end surface bordering the shaft 13 and normal to the core axis 10.

The second core rod 8, the base body and the piston 12 are all arranged independently movable. Thus, each can individually be brought into positions independent of the positions of the others. The individual movements are driven by electric motors that are controlled by a control unit in form of a PLC (not shown).

In a longitudinally forward portion, the second core rod 8 comprises a segment 18 that tapers toward the front end. The contact surface 9 of the second core 8 is a front end surface that is normal to the core axis 10.

Typical lengths (L) of the through hole of cutting insert green body 5 that can be formed in the inventive press tool is 6-10 mm. In a cutting insert green body 5 having a through hole 6 with a countersink at both sides, a typical length of a cylindrical central part of the through hole 6 is 1-5 mm. In the example embodiment, the head has a longitudinal length of 1.3 mm, a portion of 1 mm of the total length (L) is formed by the tapering segment of the second core rod 8, and a portion of 0.7 mm of the total length (L) is formed by the tapering segment 16 of the first core rod 7. The cross section of the head 14 and the core rods over the length (L) is elliptical. The head 14 has a constant cross section. Typical dimensions for the long axis of the elliptical cross section of the head is 3-10 mm, and in the example embodiment 5.4 mm.

The die, the punches, the second core rod 8, the base body 11 and the shaft 13 of the piston 12 are made of cemented carbide. The head 14 of the piston 12 is made of steel having a Young's modulus (E) of 200 GPa.

With reference to schematic FIGS. 3-3*f,* in the following an embodiment of the method of forming a cutting insert green body with the above described first embodiment of the inventive press tool.

Figure 3A:
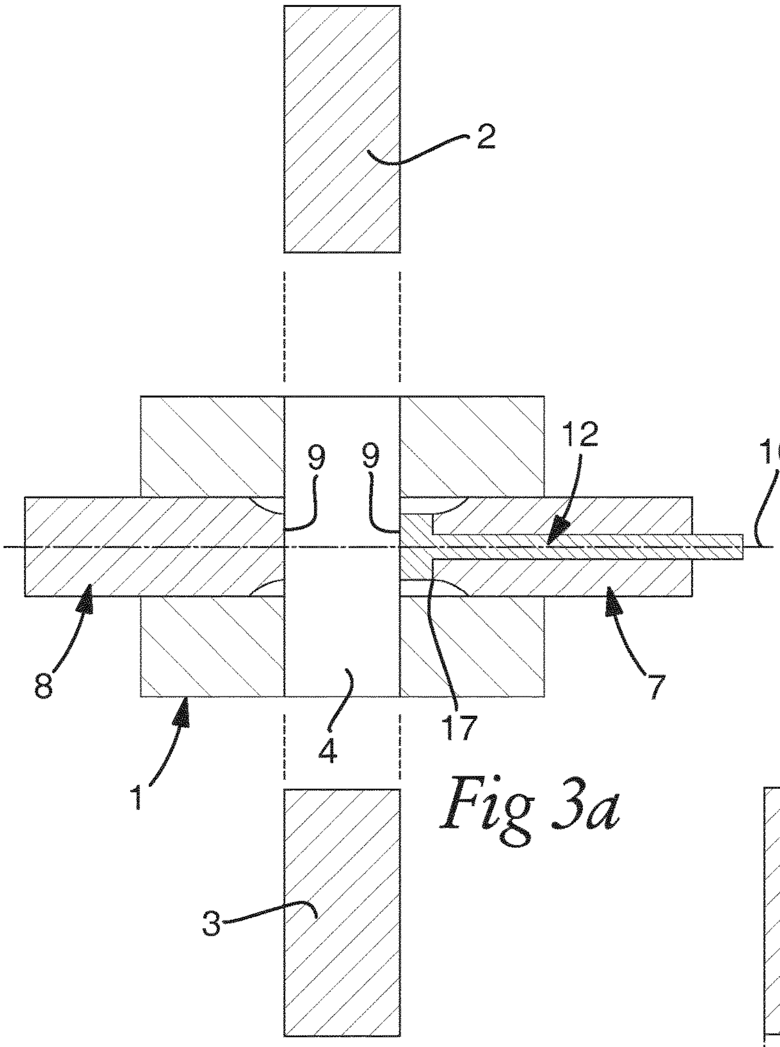
FIGS. 3*a*-3*f* are longitudinal sections, as indicated in FIG. 3, of the press tool in a sequence according to the first embodiment of the inventive method.

In FIG. 3*a*, both the first core 7 and the second core rod 8 are arranged longitudinally along the core axis 10 with their respective contact surfaces 9 at their respective front ends facing each other. The shaft 13 of the piston 12 is arranged in the bore 15 of the base body 11, wherein the longitudinal axis of the shaft 13 coincides with the core axis 10. The piston 12 is moved along the core axis 10 to a retracted position, wherein the abutment surface 17 of the head 14 abuts against the abutment surface 17 of base body 11.

Figure 3B:
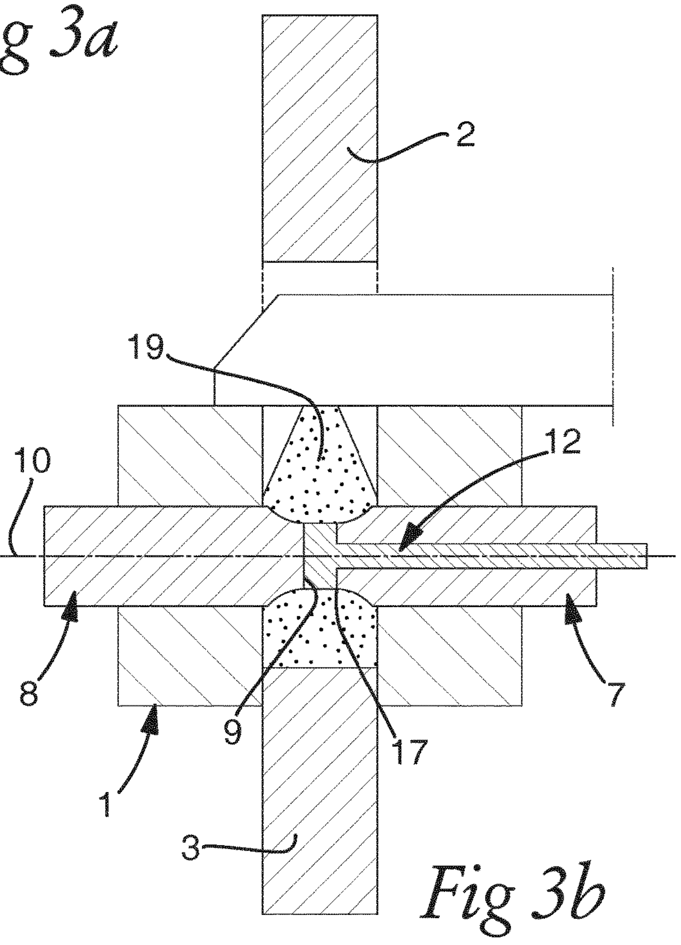

The first core rod 7 and the second core 8 are moved along the core axis to their respective press position. Therein, both the first core rod 7 and the second core 8 are moved forward toward a central position in the cavity 4. When both the first core rod 7 and the second core rod are in their respective press position as shown in FIG. 3*b*, their respective contact surfaces 9 contact each other inside the cavity 4 in the compression space. The piston 12 is still in the retracted position wherein the abutment surfaces 17 abut against each other. The lower punch 3 is raised to form a bottom in the cavity 4 and the cavity 4 is filled with a predetermined amount of metallurgical powder 19. The powder 19 flows around and past the core rods 7, 8 and fills a portion of the cavity from below and upwards. Eventually, the core rods 7, 8 are surrounded by the powder 19.

Figure 3C:
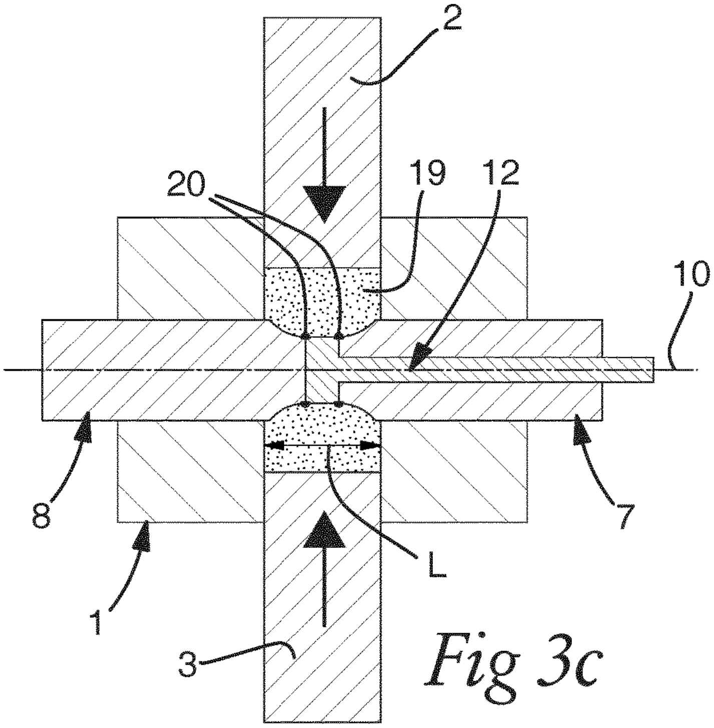

In FIG. 3*c*, the cavity is operated to compress the powder 19 by moving the punches 2, 3 towards each other and thereby compressing the powder 19 in a compression space. The compression space is a reduced space in the cavity 4 and has the same shape and dimensions as the cutting insert green body 5 that is to be formed. At the beginning of the compression, the punches are moved faster than at the end. During compression, the core rods 7, 8 remain in their respective press positions. As can be seen, the through hole 6 having length (L) is formed by the first core rod 7 and the second core rod 8, wherein the first core rod 7 and the second core rod 8 together form a continuous core rod. Therein, a portion of length (L) is occupied by the tapering segment 18 of the second core rod 8, a portion of length (L) is occupied by the head 14, and a portion of length (L) is occupied by the tapering segment 16 of the base body 11. The continuous core rod formed by the first core rod 7 and the second core rod 8 is mirror symmetrical over a cross sectional plane through the longitudinal centre of the head 14. The continuous core rod with the tapering segments forms a through hole 6 with a countersink at both sides.

In order to compact the powder at the countersinks an extra amount, the core rods are pushed together to force the head 14 to elastically reduce the length thereof about 20-30 μm.

After the punches have reached their closest position and the powder 19 has been compressed a predetermined amount, the press tool is unloaded by moving the punches 2, 3 a small distance of 0.07 mm apart. This allows the compressed body to relax and prevent the core rods 7, 8 from jamming inside the through hole 6.

Figure 3D:
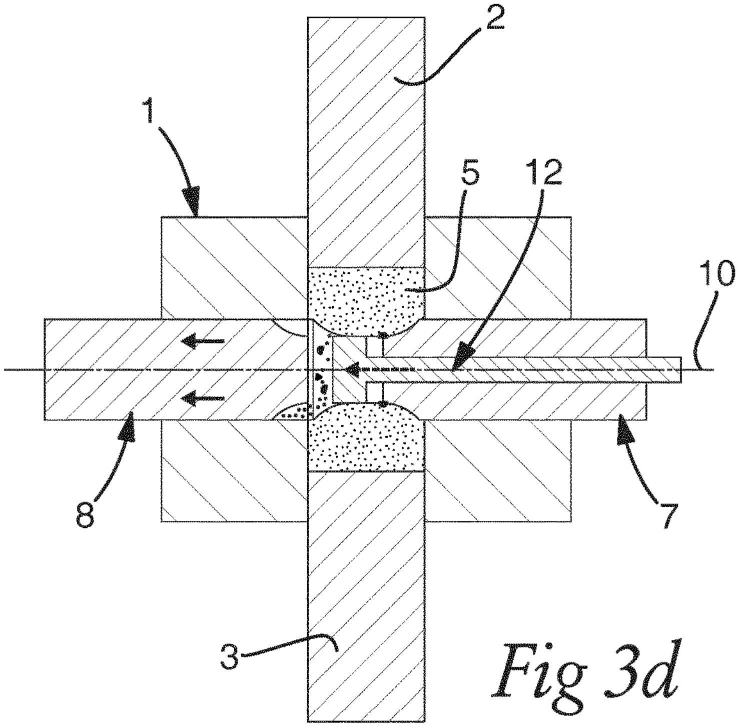

During compression, annular burr rings 20 are formed in the wall of the through hole 6 the contact surfaces and where the abutment surfaces meet, i.e. at both sides of the head 14. In order to remove these, the second core rod 8 is moved rearward along the core axes 10 so that the contact surface 9 thereof is outside the through hole 6 and the compression space. Thereafter, as can be seen in FIG. 3*d*, the piston 12 is moved forward along the core axis 10 to a first extended position, while the base body 11 remains still. When the base body 11 and the piston 12 are such arranged, the first core rod 7 is in a scraping position. Due to the head 14 having a constant cross section that is equal to smallest cross section of the tapering segment 18 of the second core rod 8, the head can move forward without damaging the countersink provided by the tapering segment 18 of the second core rod 8. Furthermore, the forwardly facing abutment surface of the base body 11 is longitudinally in the same position in the through hole 6 as when the first core rod 7 is in the press position. Thereby, the countersink provided by the tapering segment 16 of the base body remains unaffected when the piston 12 is moved forward. During the forward movement to the first extended position of the piston 12, the head travels over the burr ring 20 formed in the thorough hole wall at the location of the interface between the contact surfaces 9. Thereby, the outer surface of the head 14, especially the circumferential front edge, scrapes off the burr ring 20 from the wall.

Figure 3E:
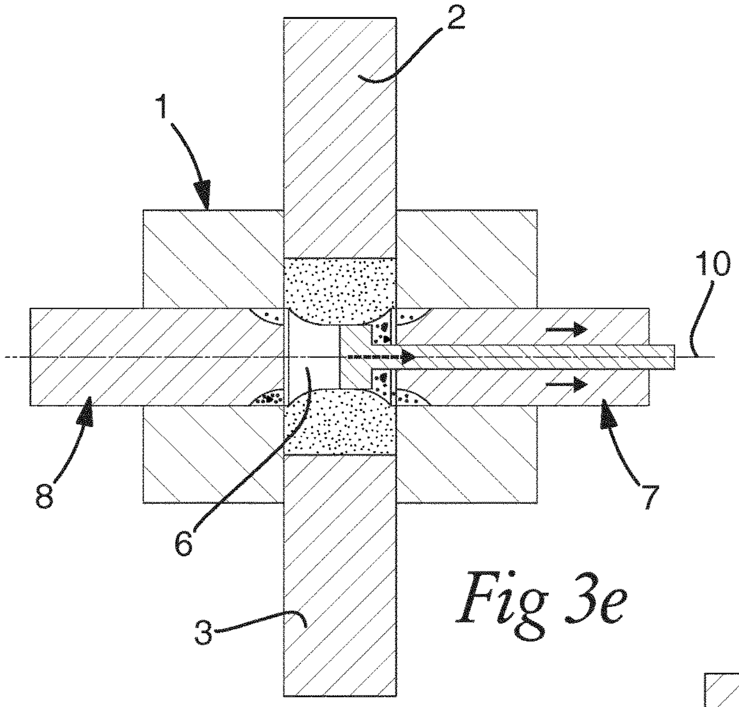
Figure 3F:
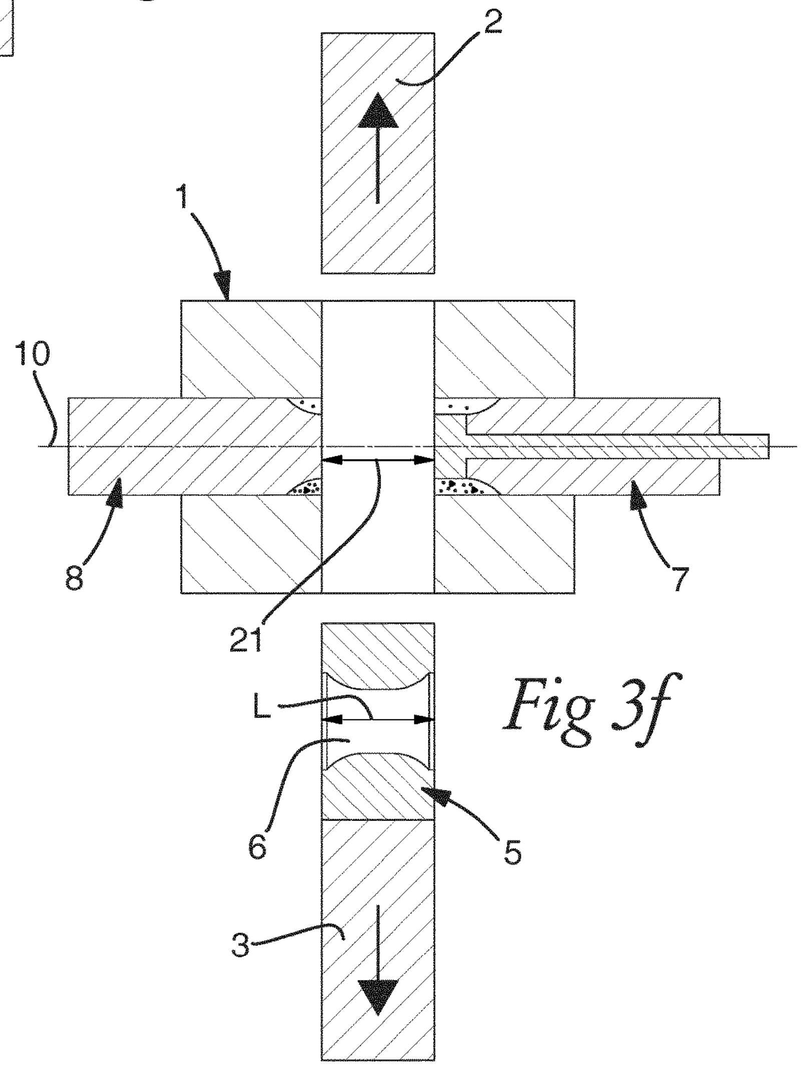

With reference to FIG. 3*e*, the base body 11 is moved rearward along the core axes 10 so that the abutment surface 17 thereof is outside the through hole 6 and the compression space. Then, the piston 12 is moved rearward along the core axis 10. Therein, the head 14 travels over the burr ring 20 formed in the thorough hole wall at the location of the interface between the contact surfaces a second time. Then, as it is moved further rearward, the head 14 travels over the burr ring 20 that was formed at the location of the interface between the abutment surfaces 17. Thereby, the outer surface of the head 14, especially the circumferential rear edge, scrapes off the burr ring 20 from the wall. Due to the head 14 having a constant cross section that is equal to smallest cross section of the tapering segment 16 of the base body 11, the head can move rearward without damaging the countersink provided by the tapering segment 16.

Eventually, the piston 12 is so far rearward that the contact surface 9 is located outside the through hole 6 and the compression space. The contact surfaces 9 of the first core rod 7 and the contact surface 9 of the second core rod 8 are then separated by a distance (21) that is larger than the length (L) of the through hole 6. In FIG. 3*f*, the cavity is operated to decompress the compression space by moving the punches 2, 3 away from each other. At the beginning of the decompression, the punches are moved more slowly than at the end. Finally, a cutting insert green body 5 formed by compressing the metallurgical powder 19 in the press tool, is removed. The cutting insert green body 5 has a through hole 6 with a countersink at both ends.

In FIGS. 4-11 alternative embodiments of the present invention are shown. These embodiments differ from the first embodiment described above mainly by the construction of the first core rod 7, why the FIGS. 4-11 and the description is limited to the description of these components.

Figure 4:
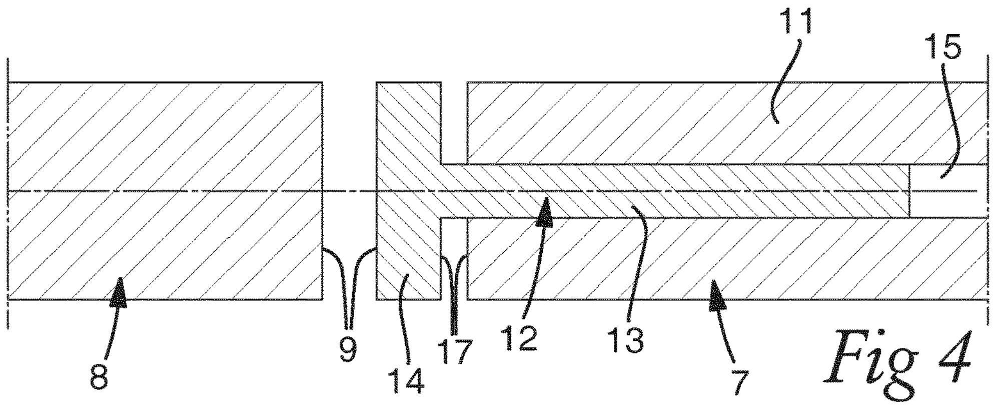
FIGS. 4-6 show longitudinal sections of the first core rod and the second core rod according to further embodiments.

FIG. 4 shows a second core 8 and a base body 11 that both lack a tapering segment. Instead, the front portion of the second core rod 8, the head 14 and the front portion of the base body 11 all have the same, constant cross section. When both the first and the second core rods 7, 8 are in their respective press positions, a continuous core rod with constant cross section is formed. This continuous core rod forms a through hole 6 with a constant cross section without countersinks.

Figure 5:
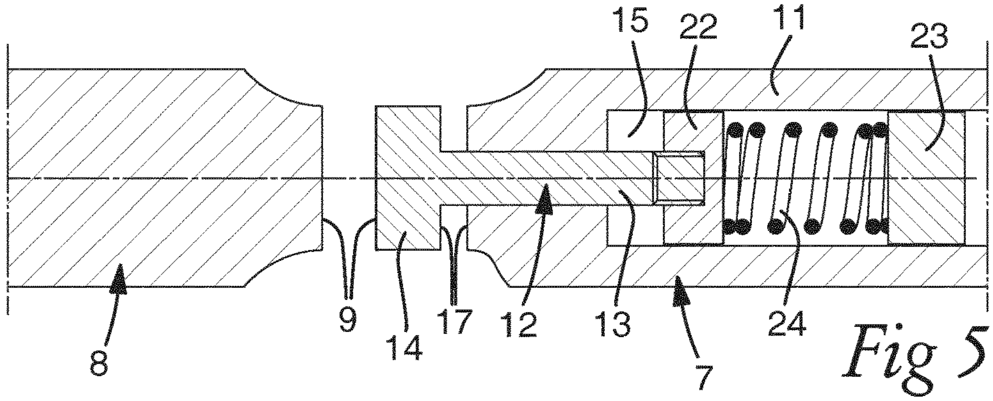

FIG. 5 shows a first core 7 wherein the piston 12 is biased toward the first extended position. The bore 15 in the base body 11 comprises a longitudinally front portion with a smaller cross section for guiding the shaft 13 and a longitudinally rear portion with a larger cross section. The shaft 13 extends into the rear portion. The rear end of the shaft comprises a thread onto which a stop nut 22 is threaded. The stop nut is slidable in the larger rear portion of the bore 15. At a rear end of rear portion of the bore 15, a support block 23 is fixed to bore wall. A resilient element in form of coil spring 24 is at a rear end attached to the support block 23 and at a front end to the stop nut 22. Due to the force exerted by the coil spring 24 acting between the fixed support block 23 and the movable stop nut 22, the piston 12 is biased toward extended positions. The force can be adjusted by fixing the support block 23 in other longitudinal positions in the rear portion of the bore 15.

The maximal extend position of the piston 12 is defined by the stop nut 22 abutting against the front wall of the rear portion of the bore 15. Thus, the stop nut 22 and the front wall of the rear portion of the bore 15 together form a stop mechanism. In this example, the stop mechanism comprises the rearwardly facing front wall of the bore 15 and the forwardly facing front surface of the stop nut 22, which are arranged opposite and facing each other along the core axis 10. When the piston 12 is in this maximal extended position and the base body 11 is moved rearward, the piston 12 will move rearward together with the base body 11. The piston 12 is also prevented from disengaging from the base body 11.

Figure 6:
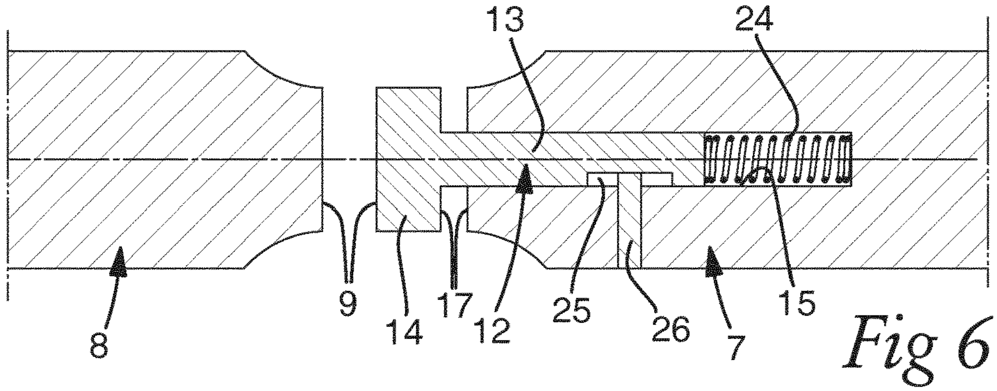

The embodiment shown in FIG. 6 differs from the embodiment described with reference to FIG. 5, in that the bore 15 has a constant cross section. The coil spring 24 is at a rear end attached to the bottom of the bore 15 and at a front end to the rear end of the shaft 13. The first core rod 7 is provided with a stop mechanism comprising a longitudinal slot 25 in the shaft 13 and a pin 26 radially protruding into the bore 15 and the slot 25. The maximal extend position of the piston 12 is defined by the pin 26 abutting against a rear wall of the slot 25. In this example, the stop mechanism comprises the forwardly facing rear wall of the slot 25 and the rearwardly facing surface of the pin 26, which are arranged opposite and facing each other along/in parallel with the core axis 10. This embodiment is advantageous in that a prior art core rod can be retrofitted with a biased piston 12 and a stop mechanism without needing access to the rear end of the first core rod 7.

In an alternative embodiment, the shaft 13 is provided with a radially protruding pin 26 that is received in a slot 25 in the bore 15.

In an alternative embodiment, the biasing force is provided by conducting pressurized fluid, such as air or oil, into the bore 15.

Figure 7A:
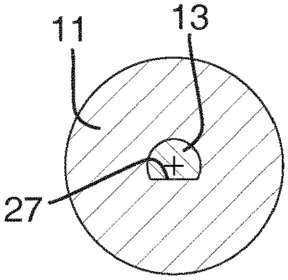
FIGS. 7*a*-7*c* are cross sectional views through the base body of additional embodiments.
Figure 7B:
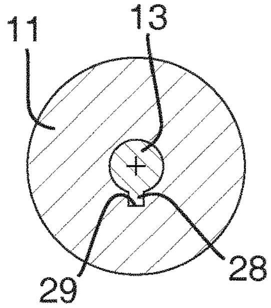
Figure 7C:
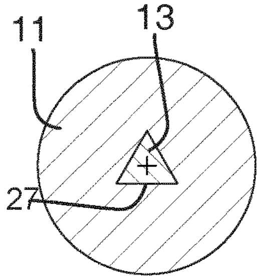

FIGS. 7*a*-7*c* show cross sections of the first core rod 7 through the shaft 13 in the bore 15 of the base body 11 according to different embodiments wherein relative rotation of the shaft 13 and the base body 11 is prevented. In FIG. 7*a*, the shaft 13 and the bore 15 each have a planar surface 27. In FIG. 7*b*, the shaft is provided with a ridge 28 that is arranged in a slot 29 in the wall of the bore 15 in the base body 11. In FIG. 7*c*, the shaft 13 is polygonal and in this case triangular. When used in a press tool with horizontal core axis 10 such as the cross hole press tool described above, debris from the scraped off burr rings 20 that falls onto the shaft 13 will slide down over the diverging side surfaces and is therefore less likely to get stuck between the shaft 13 and the bore 15.

Figure 8:
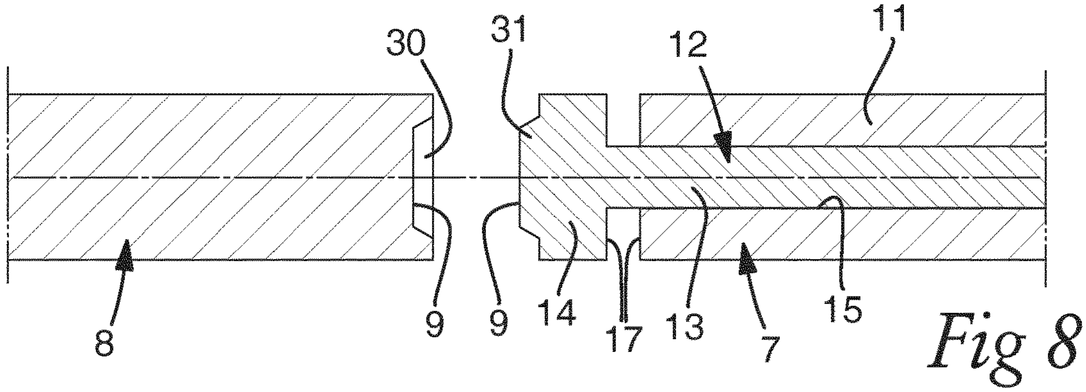
FIG. 8 shows a longitudinal section of the first core rod and the second core rod according to another embodiment.

In FIG. 8, an embodiment is shown wherein the front end of one of the second core rod 8 comprises a rearward extending recess 30, and the front end of the head 14 comprises a mating forward extending projection 31. The contact surface 9 of the second core 8 is a bottom surface of the recess 30, and the contact surface 9 is front end surface of the projection 31. The circumferential side surfaces of the recess 30 and the projection 31 are conical. When the first core rod 7 and the second core rod 8 are moved to their respective press positions, these conical side surfaces guide the first core rod 7 and the second core rod 8 into alignment when the contact surfaces 9 are brought into contact.

Figure 9:
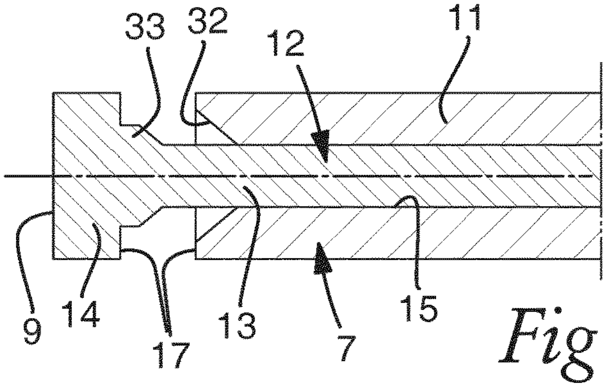
FIGS. 9-11 shows longitudinal sections of the first core rod according to further embodiments.

In FIG. 9, an embodiment is shown wherein the opening of the bore 15 is provided with a countersink 32. The piston 12 comprises a neck 33, which extends along the core axis from the rear end of the head to a front end of the shaft, and mates with the countersink 32 in the base body bore 15. The circumferential side surfaces of the countersink 32 and the neck 33 are conical. When the piston 12 is retracted in the base body 11, these conical side surfaces guide the head 14. Thereby the piston 12 and the base body 11 are brought into alignment when their respective abutment surfaces abut against each other.

Figure 10:
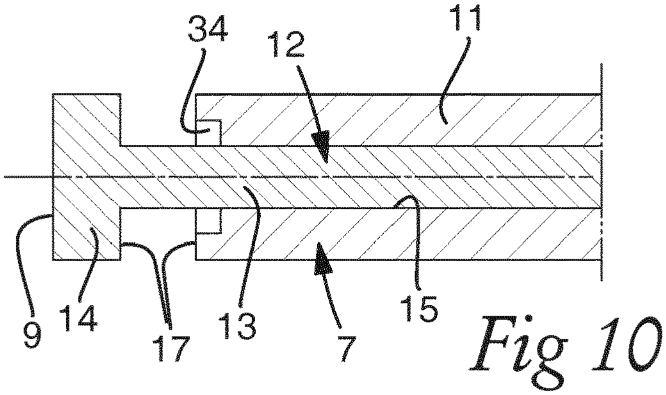
Figure 11:
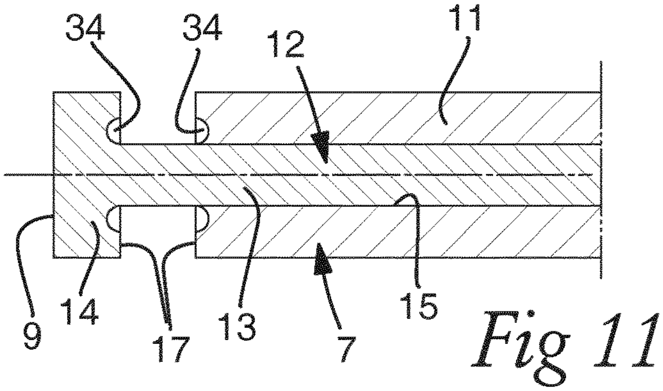

FIGS. 10 and 11 show one example embodiment each of grooves 34 arranged in the abutment surface/abutment surfaces 17. In the embodiment of FIG. 11, an annual groove 34 is provided in the abutment surface 17 surrounding the opening of the bore 15. The groove 34 has a square cross section. In FIG. 11, in addition, an annular groove 34 is provided in the abutment surface 17 of the head 14. In the embodiment of FIG. 11, both grooves 34 have semi-circular cross sections. When used in a press tool such as the cross hole press tool described above, debris from the scraped off burr rings 20 can be collected in these grooves 34 and is therefore less likely to get stuck between the shaft 13 and the bore 15.

The invention claimed is:

1. A press tool for forming, by compressing a powder, a cutting insert green body having a through hole of length, the press tool comprising a cavity arranged to define a compression space corresponding to dimensions of the cutting insert green body; and a first core rod and a second core rod together forming the through hole, each first and second core rod having a longitudinal extension from a front end to a rear end, and a contact surface at the front end, wherein the first core rod and the second core rod both are longitudinally arranged along a core axis with their respective front ends facing each other, the first core rod and the second core rod both being movably arranged in both directions of the core axis, wherein the first core rod and the second core rod both are movable to a respective press position and to a respective release position, wherein when both the first core rod and the second core rod are in their respective press positions, their respective contact surfaces contact each other inside the compression space, and wherein, when both the first core rod and the second core rod are in their respective release positions, their respective contact surfaces are separated by a distance that is larger than the through hole length, wherein the first core rod includes a longitudinally extending rearward portion in form of a base body, which, at a front end, includes a forwardly facing abutment surface, and a piston having a rear portion in a form of a longitudinally extending shaft and a front portion in form of a radially protruding head, wherein the contact surface is a front end surface of the head, the head including, at a rear end, a rearwardly facing abutment surface, and wherein the shaft is longitudinally movably arranged in the base body along the core axis, such that the piston is movable to a plurality of extended positions and to a retracted position, in which retracted position the abutment surface of the head abuts against the abutment surface of the base body, and wherein, when both the first core rod and the second core rod are in their respective press positions, the piston is in the retracted position.

2. The press tool according to claim 1, wherein the first core rod is movable to a scraping position, wherein the forwardly facing abutment surface of the base body is at most so far forward as when the first core rod is in the press position, wherein the piston is in a first of the plurality of extended positions, and wherein the contact surface in a form of the front end surface of the head is further forward than in the press position.

3. The press tool according to claim 1, wherein the second core rod includes a segment that tapers toward the front end, the base body comprises a segment that tapers toward the front end, the head has a constant cross section, and wherein, in the press position, the length includes at least a portion of the tapering segment of the second core rod, the head, and at least a portion of the tapering segment of the base body.

4. The press tool according to claim 1, wherein the piston is biased toward a first extended position.

5. The press tool according to claim 4, wherein the piston is biased by means of a resilient element, which, in a rear end, abuts a forwardly facing surface of the base body, and, in a front end, a rearwardly facing surface at the shaft.

6. The press tool according to claim 1, wherein the first core rod includes a stop mechanism defining a maximal extended position of the plurality of extended positions of the piston.

7. The press tool according to claim 6, wherein the stop mechanism includes a base body stop surface, and a shaft stop surface, wherein the base body stop surface and the shaft stop surface are arranged opposite and facing each other as seen along the core axis, and wherein when the piston is in the maximal extended position, the base body stop surface and the shaft stop surface contact each other.

8. The press tool according to claim 1, wherein the front end of one of the first core rod and the second core rod includes a rearward extending recess, and the front end of the other one of the first core rod and the second core rod includes a mating forward extending projection, wherein, when both the first core rod and the second core rod are in their respective press positions, the projection is received in the recess for aligning the first core rod and the second core rod.

9. The press tool according to claim 1, wherein the base body has a bore that extends rearward from an opening in the front end of the base body, wherein a rear end of the shaft extends through the opening and into the bore, and wherein the forwardly facing abutment surface of the base body is a front end surface surrounding the opening.

10. The press tool according to claim 9, wherein the opening of the bore in the base body includes a countersink.

11. The press tool according to claim 10, wherein the piston further includes a neck, which extends along the core axis from the rear end of the head to a front end of the shaft, and mates with the countersink, wherein the rearwardly facing abutment surface of the head is a rear end surface bordering the neck, and, when the piston is in the retracted position, the neck is received in the countersink for aligning the piston and the base body.

12. The press tool according to claim 1, wherein the core axis is horizontal, and the shaft has side surfaces that converge upward forming a ridge.

13. The press tool according to claim 1, wherein the head has a length in an axial direction of the core axis, wherein an axial length of the head, in the press position, is reduceable by 5-40 μm.

14. A method for forming a cutting insert green body having a through hole of a length with a press tool, the press tool comprising:

a cavity;

a first core rod and second core rod, which each have a longitudinal extension from a front end to a rear end, and a contact surface at the front end, wherein the first core rod includes a longitudinally extending rearward portion in form of a base body, which, at a front end, includes a forwardly facing abutment surface;

a piston having a rear portion in form of a longitudinally extending shaft, and a front portion in form of a radially protruding head, wherein the contact surface is a front end surface of the head, and the head includes, at a rear end, a rearwardly facing abutment surface;

the method comprising the steps of:

arranging both the first core rod and the second core rod longitudinally along a core axis with their respective front ends facing each other;

arranging the piston with the shaft thereof longitudinally along the core axis in the base body;

moving the piston along the core axis to a retracted position, wherein the abutment surface of the head abuts against the abutment surface of the base body;

moving the first core rod and the second core rod along the core axis to a respective press position, wherein their respective contact surfaces contact each other inside the cavity in a compression space, which corresponds to the dimensions of the cutting insert green body;

filling the cavity with a predetermined amount of powder;

operating the cavity to compress the powder in the compression space to form the cutting insert green body;

moving, along the core axis, the second core rod rearward and the piston forward to a first extended position;

moving the first core rod and the second core rod along the core axis to a respective release position, wherein their respective contact surfaces are separated by a distance that is larger than the length of the through hole;

operating the cavity to decompress the compression space; and removing the cutting insert green body.

15. The method according to claim 14, wherein, after the steps of moving the first core rod and the second core rod to the respective press position, and moving the piston along the core axis to the retracted position, further comprising the step of reducing an axial length of the head in the direction of the core axis by 5-40 μm, by moving the contact surface of the first core rod and the contact surface of the second core rod against each other.

* * * * *